United States Patent Office 3,551,341
Patented Dec. 29, 1970

3,551,341
CHEMILUMINESCENT SMOKES
Urho Albert Lehikoinen, Detroit, Mich., assignor to Ethyl Corporation, New York, N.Y., a corporation of Virginia
No Drawing. Filed June 29, 1967, Ser. No. 649,821
Int. Cl. C09k 3/00
U.S. Cl. 252—188.3                16 Claims

ABSTRACT OF THE DISCLOSURE

Chemiluminescent smoke, that is, a smoke visible both by day and night, is produced when a composition consisting essentially of (a) an aluminum alkyl, (b) an ether or an amine complexing agent, and (c) a porphine, is contacted with air and water.

BACKGROUND OF THE INVENTION

Many compounds such as benzaldehyde, 5-aminophthalic hydrazide, Grignard reagents, and others, in the presence of suitable oxidizers, will undergo reactions which will liberate sufficient energy to raise the molecule, or its reaction products, to an excited state. Upon decay to ground state, the molecule releases energy as chemiluminescence or a visible light. Moreover, military screening, marking, and signalling smokes have been used for decades and new ones are being developed as needed. Most recently, a demand has risen for signalling means which would appear as a smoke during daytime and as a chemiluminescent cloud at night.

SUMMARY OF THE INVENTION

An improved smoke-producing material is provided by a composition consisting essentially of (a) a trialkyl aluminum or an aluminum alkyl hydride which is previously complexed with
(b) a complexing agent selected from a monoether, diether, or a triether or a tertiary amine, and admixed with
(c) a porphine.

When the above composition comes in contact with air and water, a cloud of smoke visible both by day and night is formed.

PREFERRED EMBODIMENTS

This invention pertains to chemiluminescent smokes containing an alkyl aluminum and a phorphine.

The particular feature of the smoke produced by a composition of this invention is the luminescent property; that is, visibility both by day and night.

An object of this invention, which is to prepare a night-visible smoke, is satisfied by providing compositions consisting essentially of (a) an aluminum alkyl having the formula

or an alkylaluminum hydride having the formula

or mixtures of said hydrides and/or aluminum alkyls wherein R, R' and R" are alkyl radicals of 1 to 4 carbon atoms, said aluminum compound being complexed with a chemically equivalent amount of
(b) a complexing agent selected from
  (1) an ether having up to about 15 carbon atoms and 1 to 3 ether-oxygen linkages, said either being free of acetylenic bonds, and
  (2) a tertiary amine having up to about 24 carbon atoms, the complexed aluminum alkyl being admixed with (c) from 20 to 50 weight percent of a porphine.

These compositions yield chemiluminescent smoke clouds when they come in contact with air or any other oxidizing agent and water. The method of water mixing is not critical. The smoke agent may be injected underneath the surface of water to yield a cloud of chemiluminescent smoke above the surface of the water. Alternatively, the smoke agent can be merely admixed with water by shaking the agent and water in a vessel. Another method for contacting the agent with water is to introduce a stream of the agent into a water spray.

Although a larger and more intense smoke cloud is produced when the composition of this invention is reacted with large quantities of water, satisfactory results are also obtained when the only water present is the water vapor normally present in the air or the water of hydration present in a compound such as an alum, when such a compound is admixed with the smoke-producing composition.

One essential ingredient in the smoke compositions of this invention is an aluminum compound of the types given above. Preferably, all alkyl radicals bonded to the aluminum atom are identical. Most preferably, these alkyl radicals are solely composed of carbon and hydrogen and have up to four carbon atoms. Typical examples of alkyl aluminums which are applicable in this invention are trimethylaluminum, triethylaluminum, diethylaluminum hydride, methyldiethylaluminum, triisopropylaluminum, tri-sec-butylaluminum, and the like.

For the purposes of this invention, the aluminum alkyl is complexed with either an ether or an amine. A wide variety of ethers can be employed. The exact nature of the ether is not critical provided it can complex with the aluminum compound and is devoid of substituent groups which lead to deleterious side effects. Preferably, the ethers have less than about 15 carbon atoms. They may have one, two, or three or more ether linkages, —O—. More preferably, the ethers employed in this invention are free from acetylenic linkages.

Monoethers which may be employed have the formula

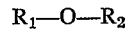

wherein $R_1$ and $R_2$ are independently selected from alkyl groups having 1 to 4 carbon atoms; aryl groups such as phenyl and tolyl; alkenyl groups of 3 to 5 carbon atoms such as allyl; cycloalkyl groups such as cyclohexyl, and the like. Typically preferred ethers of this type are diethyl ether, isopropyl ether, allyl ether, phenyl ether, benzyl ether, benzyl ethyl ether, α-methyl-benzyl ether, and the like. Cyclic monoethers can be employed. A highly preferred ether which is used in this invention is tetrahydrofuran. Biethers, that is, ethers which contain two ether oxygen linkages, can be employed in this invention. Typical ethers of this type which may be employed are ethylene glycol diethyl ether, ethylene glycol dibutyl ether, ethylene glycol diamyl ether, and the like.

Triethers (sometimes referred to as tridentate ethers) which may be employed in this invention preferably have the ether oxygen linkages separated by two carbon atoms; that is, ethylene radicals. Typical ethers of this type which can be employed in this invention are diethyleneglycol dimethylether, diethyleneglycol diethylether, and diethyleneglycol dibutylether.

As mentioned above, aluminum alkyls can also be complexed with an amine. A wide variety of tertiary and hindered secondary amines can be employed. The exact nature of the amine is not critical, provided it can complex with the aluminum compound and is devoid of substituent groups which lead to deleterious side effects. Any tertiary amine may be employed, but for practical reasons, tertiary amines having up to about 15 carbon atoms are preferred. Illustrative examples of applicable amines are N,N-dimethylaniline, dicyclohexylamine, N-benzyl-N-ethylaniline, N-benzyl-N-ethyl-m-toluidine, dibenzylamine, ditolylamine, diisobutylamine, tert-butylamine, N,N-diethylaniline, tribenzylamine, tri-n-octylamine, triphenylamine, N,N-dimethylbenzylamine, dodecyldimethylamine, N,N-di-methyl-o, m, and p-toluidines, N,N-diethyl-o, m, and p-toluidines, N,N-ethylmethylaniline and the like. Preferably, the amines are selected from hexamethylenetetramine and tetra(lower alkyl)diamines and hexa(lower alkyl)diamines such as tetramethylenediamine, tetraethylenediamine, tetrapropylenediamine, tetrabutylenediamine, hexamethylenediamine, hexaethylenediamine, hexapropylene, hexabutenediamine, and the like.

Although the above-described complexing agents are preferred, other complexing agents may also be employed. Examples of such additional agents are thioethers, organic phosphines such as tributylphosphine, trioctylphosphine, and triphenylphosphine, and metal salts, especially alkali and alkaline earth metal salts such as lithium chloride and triethylaluminum-sodium fluoride complex.

The complexing of the alkyl aluminum with an ether or an amine above described is readily carried out by simply mixing the complexing agent and the alkyl aluminum under anhydrous conditions and in the presence of an inert atmosphere. Typically, nitrogen is used to provide the inert atmosphere. However, other inert gases such as argon and neon can be employed, if desired. Best results are obtained when all of the alkyl aluminum is complexed. When using a monoether, at least one mole of ether is employed for each mole of alkyl aluminum. Similarly, when a diether is employed, at least one-half mole of ether is employed for each mole of alkyl aluminum. Furthermore, with tridentate ethers the mole ratio of ether to aluminum is at least 1 to 3. When using a diamine, at least one-half mole of amine is employed for each mole of alkyl aluminum. Similarly, when a tetramine is employed, at least one-quarter mole of amine is employed for each mole of alkyl aluminum.

It is not necessary to employ an exactly chemiequivalent amount of a complexing agent and alkyl aluminum. An excess of ether or amine can be used. When volatile complexing agents such as diethyl ether are employed, an excess of the complexing agent may be beneficial. In some instances, it appears that the presence of an excess of a complexing agent yields a larger smoke cloud. Consequently, it is convenient to employ up to 5 equivalents of a complexing agent for each equivalent of alkyl aluminum.

Another important ingredient in the compositions of this invention is a porphine and its derivatives having the following generic formula:

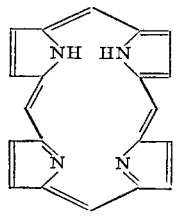

Illustrative examples of porphines useful in this invention are porphine, alkyl-substituted porphines such as 20-methylporphine, 5,9,14,20-tetraethylporphine, 4,14-dipentylporphine, as well as metal chelates of Groups IB, IIA, IIB, IIIA and transition metals. Specific examples of metals which form chelates are copper, iron, cobalt, manganese, calcium, magnesium, nickel, and the like.

After the alkyl aluminum is complexed, it is then mixed with an amount of a porphine which is sufficient to yield a final preparation containing from 20 to 50 weight percent of a porphine of the type described above. The mixing of the complex with a porphine compound is conveniently carried out using simple mixing procedures. As in the case of complexing, a slight amount of heat may be beneficial; that is, it may be desirable to heat up the mixture to a temperature within the range of 30–50° C.

As pointed out above, the chemiluminescent smoke formulations of this invention yield smoke clouds which are visible at night when contacted with air and water. The water need not be pure; natural waters such as lake, river or sea water can be employed as can muddy or wet earth. In addition, the water may be chemically bound; that is, waters of hydration. When using chemically-bound water, a compound which preferentially contains a large amount of waters of hydration is employed. Preferred compounds containing waters of hydration are alums. Typical alums which may be used are described on pages 196–199 of the 8th edition of Lange's "Handbook of Chemistry," Handbook Publishers, Inc., Sandusky, Ohio (1952).

To further illustrate the invention, the following non-limiting examples are presented. Unless otherwise indicated, all parts are by weight.

EXAMPLE 1

Two hundred and twenty-six milliliters of diethyl ether is admixed with 290 ml. of triethylaluminum under anhydrous conditions and in the presence of a nitrogen atmosphere. This yields a diethyl ether-triethylaluminum complex. To the resultant mixture is added 400 grams of porphine.

The resultant smoke formulation yields a chemiluminescent smoke when admixed with water in air. For example, equal volumes of agent and water when admixed together yield a chemiluminescent smoke. Furthermore, such a smoke is produced when one volume of agent is injected under the surface of approximately 10 volumes of water without stirring. Thirdly, the formulation yields a chemiluminescent smoke when 50 parts of the formulation are added to 100 parts of $[Cr_2(SO_4)_3 \cdot K_2SO_4 \cdot 24H_2O]$.

EXAMPLE 2

Following the procedure of Example 1, smoke formulations containing equimolar amounts of diethyl ether and triethylaluminum and 40 percent of 20-methylporphine are prepared. When these formulations are admixed with water, chemiluminescent smokes are produced.

Similar results are obtained when 20-methylporphine is replaced by 5,9,14,20-tetraethylporphine and a copper chelate of porphine.

EXAMPLE 3

Equimolar complexes of tetrahydrofuran with triethyl aluminum and dioxane with triethylaluminum are prepared using the procedure of Example 1. They are admixed with sufficient quantities of 4,14-dipentylporphine to yield formulations containing 20, 30, 40, and 50 weight percent of the porphine.

EXAMPLE 4

Seven parts of hexamethylenetetramine is admixed with 22.8 parts of triethylaluminum under anhydrous conditions and in the presence of a nitrogen atmosphere. This yields an amine-triethyl aluminum complex. To the resultant complex is added 0.9 part of tetrahydrofuran and then 20 parts of 15-isobutylporphine.

This smoke agent has the following formulation:

Hexamethylenetetramine—13.8 weight percent
Triethylaluminum—45.0 weight percent
15-isobutylporphine—39.5 weight percent
Tetrahydrofuran—1.8 weight percent The tetrahydrofuran is not a critical ingredient but aids in the solubilization of the hexamethylenetetramine. Usually, about 1 to 3 weight percent of such a solubilization agent is efficaciously employed. Besides, tetrahydrofuran, ethers described above as complexing agents may be employed as solubilizing agents.

Similar results are obtained when in the above example hexamethylenetetramine is substituted with tetraethylenediamine, N,N,N',N'-tetraethyl ethylenediamine, N,N,N',N'-tetrabutyl ethylenediamine; triethylaluminum is substituted with triisopropylaluminum, tributylaluminum, and diethylaluminum hydride; 15-isobutylporphine is substituted with iron, magnesium, and nickel chelates of porphine and 15-isobutylporphine.

Following the procedure of Examples 1 and 3, smoke agents containing ethyl ether, phenyl ether, diethyl carbitol, anisol, p-chloroanisole, veratole, α-methylbenzyl ether, and benzyl ether are prepared.

The smokes of this invention which are visible at night have many utilities. For example, they can be employed for marking purposes in sea rescues. Similarly, they may be used to direct artillery fire or aerial bombardments.

An important aspect of this invention is that the smokes are visible by day and at night. Hence, they have daytime and nightime utilities. Accordingly, the compositions of this invention have a dual function. It is believed that this dual function is not accomplished by smokes and flares presently in use.

Having fully described the novel compositions of this invention, their method of preparation, and their utility, it is desired that the scope of this invention be solely limited by the lawful extent of the appended claims.

What is claimed is:

1. A chemiluminescent smoke composition being prepared by mixing
   (a) an aluminum alkyl having the formula:

RR'R''Al wherein R, R' and R'' are alkyl radicals of 1 to 4 carbon atoms, said aluminum alkyl being complexed with at least a chemically equivalent amount of
   (b) a complexing agent selected from the group consisting of
      (i) an unsubstituted ether having up to about 15 carbon atoms and 1 to 3 ether-oxygen linkages, said ether being free of acetylenic bonds, and
      (ii) a tertiary amine having up to about 15 carbon atoms,
   the complexed aluminum alkyl being admixed with
   (c) from 20 to 50 weight percent (based on the total weight of the smoke composition) of a porphine selected from the group consisting of porphine, alkyl-substituted porphine, metal chelated porphine, and metal chelated alkyl-substituted porphine, said alkyl groups having from 1 to 5 carbon atoms.

2. A smoke composition of claim 1 wherein said aluminum alkyl is triethylaluminum.

3. A smoke composition of claim 2 wherein said porphine is alkyl-substituted, said alkyl substituents having up to 5 carbon atoms.

4. A smoke composition of claim 2 wherein said complexing agent is an unsubstituted monoether having the formula:

$R_1$—O—$R_2$ wherein $R_1$ and $R_2$ are independently selected from alkyl groups having 1 to 4 carbon atoms, alkenyl groups having 3 to 5 carbon atoms, cyclohexyl, phenyl, and tolyl groups.

5. A smoke composition of claim 4 wherein said complexing agent is diethylether.

6. A smoke composition of claim 2 wherein said complexing agent is tetrahydrofuran.

7. A smoke composition of claim 2 wherein said complexing agent is dioxane.

8. A smoke composition of claim 2 wherein said complexing agent is a tertiary amine selected from the group consisting of hexamethylenetetramine, tetra(lower alkylene) diamine, and hexa(lower alkylene)diamine, said lower alkylene groups having from 1 to 4 carbon atoms.

9. A smoke composition of claim 8 wherein said complexing agent is hexamethylenetatramine.

10. A smoke composition of claim 8 wherein said complexing agent in N,N,N',N'-tetra(lower alkyl) ethylene diamine, said lower alkyl having 1 to 4 carbon atoms.

11. A smoke composition of claim 2 wherein said porphine is selected from the group consisting of porphine, 20-methylporphine, 5,9,14,20-tetraethylporphine, 15-isobutylporphine, 4,14-dipentylporphine, porphine copper chelate, 15-isobutylporphine iron chelate, 15-isobutylporphine magnesium chelate, and porphine nickel chelate.

12. A smoke composition of claim 4 wherein said porphine is selected from the group consisting of porphine, 20-methylporphine, 5,9,14,20-tetraethylporphine, 15-isobutylporphine, and 4,14-dipentylporphine.

13. A smoke composition of claim 9 wherein said porphine is selected from the group consisting of porphine, 20-methylporphine, 5,9,14,20-tetraethylporphine, 15-isobutylporphine, and 4,14-dipentylporphine.

14. A smoke composition of claim 5 wherein said porphine is porphine.

15. A method for producing a chemiluminescent smoke, said method comprising contacting a smoke composition of claim 1 with air and water.

16. A method of claim 15 wherein said water is from an alum having the formula $[Cr_2(SO_4)_3 \cdot K_2SO_4 \cdot 24H_2O]$.

References Cited

UNITED STATES PATENTS

| 3,309,268 | 3/1967 | Sherman | 424—40 |
| 3,400,082 | 9/1968 | Gluckstein et al. | 252—305 |

JOHN D. WELSH, Primary Examiner

U.S. Cl. X.R.

149—109; 252—305